United States Patent [19]

Hoheisel et al.

[11] Patent Number: 4,550,833

[45] Date of Patent: Nov. 5, 1985

[54] VARIABLE-VOLUME RECEPTACLE, ESPECIALLY FOR USE AS A COMPENSATING RECEPTACLE IN BUILDING HEATING SYSTEMS

[75] Inventors: Peter Hoheisel; Peter Bartholmei, both of Northeim, Fed. Rep. of Germany

[73] Assignee: Continental Gummi-Werke Aktiengesellschaft, Hanover, Fed. Rep. of Germany

[21] Appl. No.: 599,507

[22] Filed: Apr. 12, 1984

[30] Foreign Application Priority Data

Apr. 16, 1983 [DE] Fed. Rep. of Germany ....... 3313853

[51] Int. Cl.⁴ .................... F22B 35/00; F28F 27/00; B65D 85/00
[52] U.S. Cl. .................................. 206/527; 206/522; 383/3; 92/45; 92/46; 236/37; 236/26 C
[58] Field of Search .................. 206/527, 455, 522; 229/72; 383/3; 150/52 R; 273/65 C; 92/45, 46; 236/37, 26 C

[56] References Cited

U.S. PATENT DOCUMENTS

| | | | |
|---|---|---|---|
| 634,302 | 10/1899 | Longden | 273/65 B |
| 1,379,709 | 5/1921 | Larson | 236/26 C |
| 1,668,669 | 5/1928 | Caldwell | 92/45 |
| 1,806,009 | 5/1931 | Whitacre | 92/46 |
| 1,997,565 | 4/1935 | Arbwckle | 92/46 |
| 2,347,197 | 4/1944 | La Liberte | 383/3 |

*Primary Examiner*—William T. Dixson, Jr.
*Attorney, Agent, or Firm*—Becker & Becker, Inc.

[57] ABSTRACT

A variable-volume receptacle, especially for use as a compensating receptacle in heating systems. The receptacle includes two membrane-like sheets of rubber or synthetic material; the sheets have the same surface areas, and are placed against one another. The edges of the sheets are bound together by a peripheral U-shaped strip which is attached to both sides. The novel edge connection is considerably more durable than the conventional overlap connection, and as a result of not being susceptible to the otherwise constant danger of tearing due to having been folded, the connection also has a much longer life than do the heretofore known overlap connections.

4 Claims, 1 Drawing Figure

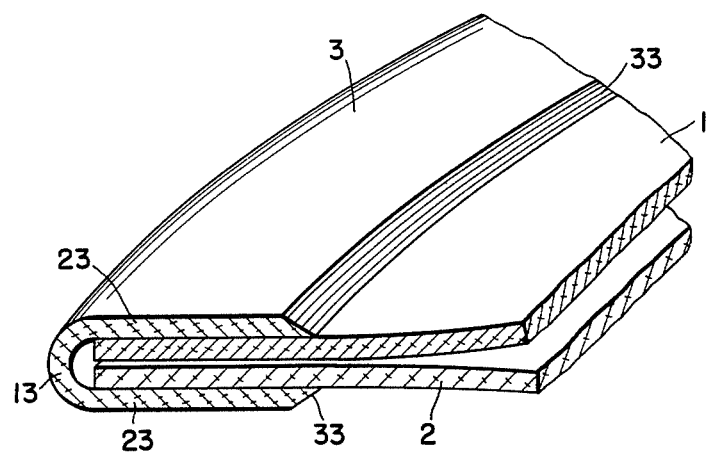

VARIABLE-VOLUME RECEPTACLE, ESPECIALLY FOR USE AS A COMPENSATING RECEPTACLE IN BUILDING HEATING SYSTEMS

BACKGROUND OF THE INVENTION

1. Field of the Invention

The present invention relates to a variable-volume receptacle, especially for use as a compensating receptacle in building heating systems; the receptacle is made in the form of a flat bag or bladder of two flexible sheets of rubber or synthetic material which are disposed against one another and are sealingly interconnected at their edges.

2. Description of the Prior Art

Up to now, in order to manufacture such a receptacle, it was customary to wrap one of the sheets, which was cut oversize, about the edges of the other sheet and to fold it down onto this other sheet in an overlapping connection, whereupon the peripheral contact zone is secured by being glued or vulcanized together. Despite the apparent simplicity of this method, a relatively high expenditure of work was connected therewith. Furthermore, the constantly present danger of defects or failures of the connection developing at a given location was the unavoidable basis for the rejection or scrapping of a certain proportion of receptacles produced pursuant to this heretofore known method. In addition, this type of connection of the edges was not able to sufficiently cope with the constantly changing buckling and bending stresses during use of the receptacle. The reason for this is that, independent of the quality of the adhesion zone, jagged tears surprisingly occurred repeatedly right in the curved portion of the overlapping larger sheet. Due to later fatigue failure, these tears lead to premature failure of the affected receptacle.

It is an object of the present invention, via a novel construction of the connecting area, to make possible a simplified manufacture of bladder-like, variable-volume receptacles while extensively eliminating otherwise imminent sources of failure, and furthermore, to greatly increase the service life and durability of the receptacle.

BRIEF DESCRIPTION OF THE DRAWING

This object, and other objects and advantages of the present invention, will appear more clearly from the following specification in conjunction with the accompanying drawing, which shows a schematic cross section through the edge region of one inventive embodiment of the novel receptacle.

SUMMARY OF THE INVENTION

The inventive variable-volume receptacle of the aforementioned general type is characterized primarily in that the receptacle sheets, which have the same surface area and are loosely disposed against one another, are continuously bound or enclosed along the periphery of the receptacle by an edge strip or molding, which is made of rubber or rubber-like synthetic material and has a U-shaped cross section with side pieces which are parallel to one another, accompanied by a tight fit of the inner surfaces of the side pieces upon the edge zones of the outer surfaces of the sheets.

Pursuant to a further feature of the present invention, the curved portion of the edge strip, which interconnects the two side pieces, may be guided around the outer edges of the sheets, which are movable relative to one another, in such a way as to be spaced from these edges. The free ends of the side pieces of the edge strip may be chamferred in a lip-like manner toward the surfaces of the sheets. The thickness of at least the side pieces of the edge strip is expediently approximately the same as the thickness of the sheets. On the other hand, the curved portion of the edge strip can also have a thickness which is greater than that of the side pieces. For example, the curved portion of the edge strip can have a bead-like widened cross-sectional portion formed on its inner surface in order to counter with increased certainty the susceptibility to failure in this critical region. The edge strip may be made of a material which is the same or similar to the rubber or synthetic material of the sheets; however, this material should be harder than the material of the sheets.

The present invention replaces the conventional overlapping connection of the receptacle sheets by a simple strip connection. Despite the need for the edge strip as an additional strip element, the overall expenditure of work to produce the sure connection could be significantly reduced, contrary to initial expectations. The edge strips, which are extruded independently of the receptacle sheets and parallel thereto in an economical manner and in long lengths, are withdrawn as needed from a previously prepared stock, and are cut to length on location to the desired dimensions. The requirement that the two receptacle sheets have the same surface area is of particular advantage on the one hand because the preparatory production steps are reduced to cutting-to-size only a single sheet size, and on the other hand because one can proceed from a standard material blank without great cutting waste.

During use of the receptacle, the outer edge strip, which extends over the edges of the sheets, forms a bending joint which, as a result of curved arch or yoke shape from the outset thereof, accomplish the angular movements forced upon it by the spreading of the sheets more easily, and with considerably less stress, than is the case with a comparable overlapping connection of the sheet edges which are disposed directly against one another. The effect of the sheet edge connection, which otherwise limits the useful life of the receptacle, is therefore fundamentally negated.

DESCRIPTION OF PREFERRED EMBODIMENTS

Referring now to the drawing in detail, the receptacle indicated therein is in the form of a variable-volume bag or bladder composed of two flexible rubber sheets 1, 2. The sheets 1, 2, which form the walls of the receptacle, are cut to size or stamped from a standard rubber sheet having a uniform thickness and no reinforcing inserts in such a way as to have the same surface area and congruent base shape. The sheets 1, 2 are placed directly against one another, and are joined together along the periphery by an edge strip or molding 3 which is placed over the edges of the sheets 1, 2. The edge strip 3, which is also made of rubber and is advantageously extruded, has a U-shaped cross section in the illustrated stress-free starting state; parallel side pieces 23 are interconnected by a curved portion 13. In the illustrated embodiment, all parts of the edge strip 3 have approximately the same thickness as do the sheets 1, 2. However, the curved portion 13 could, as a variation, have a greater thickness, and could, for example, be provided with a widened cross sectional portion which is formed on its inner surface should this be necessary for reasons of strength.

The free ends of the side pieces 23 taper off toward the surfaces of the sheets 1, 2 with a lip-like bevel or chamfer 33.

Where the edge strip extends over the edge zones of the sheets 1, 2, it is bonded thereto by means of an adhesive. Since the sheets 1, 2 are not themselves directly bonded together, and are also movable relative to one another in the edge region, all spreading or angular movements introduced by the deformations of the receptacle walls are exclusively imparted to the curved portion 13 of the edge strip 3. A more favorable movement pattern results if the edge strip 3 has a greater hardness than do the sheets 1, 2.

The present invention is, of course, in no way restricted to the specific disclosure of the specification and drawing, but also encompasses any modifications within the scope of the appended claims.

What we claim is:

1. A variable-volume receptacle adapted for use as a compensating receptacle in building heating systems, in the form of a substantially flat bladder, said receptacle comprising:

two flexible sheets of elastomeric material, said sheets having the same surface area, and being disposed loosely against one another, with their peripheral edges being substantially flush, to form said bladder; said sheets, when disposed against one another, having respective outer surfaces which are directed away from one another; and an edge strip of elastomeric material for continuously sealingly interconnecting said sheets along said peripheral edges thereof; said edge strip has an essentially U-shaped cross-section, with two parallel side pieces and a curved portion which interconnects said side pieces; said side pieces each have an inner surface directed toward one another and respectively adhesively connected to respective ones of said outer surfaces of said sheets to effect said continuous sealing interconnection thereof, the thickness of at least said side pieces of said edge strip being approximately the same as the thickness of said sheets; said curved portion of said edge strip being guided around and spaced from said peripheral edges of said sheets, which are movable relative to one another; the material of said edge strip being at least similar to, though harder than, that of said sheets.

2. A receptacle according to claim 1, in which those ends of said side pieces of said edge strip remote from said curved portion thereof are chamferred in a lip-like manner toward said outer surfaces of said sheets.

3. A receptacle according to claim 1, in which said curved portion of said edge strip has a greater thickness than do said side pieces thereof.

4. A receptacle according to claim 3, in which said curved portion has a bead-like widened cross-sectional portion on its inwardly directed surface.

* * * * *